United States Patent [19]

Acampora et al.

[11] Patent Number: 5,168,356
[45] Date of Patent: Dec. 1, 1992

[54] APPARATUS FOR SEGMENTING ENCODED VIDEO SIGNAL FOR TRANSMISSION

[75] Inventors: Alfonse A. Acampora, Staten Island, N.Y.; Robert J. Siracusa, Lawrenceville, N.J.

[73] Assignee: General Electric Company, Princeton, N.J.

[21] Appl. No.: 814,207

[22] Filed: Dec. 20, 1991

Related U.S. Application Data

[63] Continuation of Ser. No. 661,982, Feb. 27, 1991.

[51] Int. Cl.$^5$ .......................... H04N 7/12; H04N 7/00; H04N 7/04; H04N 5/2
[52] U.S. Cl. .................................... 358/133; 358/141; 358/135; 375/25; 375/27; 370/110.1
[58] Field of Search ............... 358/133, 135, 136, 138, 358/141, 142, 12, 11; 375/122, 25, 27; 364/725; 371/2; 341/143; 370/118, 119, 110.1, 99

[56] References Cited

U.S. PATENT DOCUMENTS

| | | | |
|---|---|---|---|
| 4,394,774 | 7/1983 | Widergren et al. | 382/56 |
| 4,544,950 | 10/1985 | Tu | 358/143 |
| 4,594,708 | 6/1986 | Servel et al. | 370/99 |
| 4,785,349 | 11/1988 | Keith et al. | 358/136 |
| 4,827,339 | 5/1989 | Wada et al. | 358/136 |
| 4,873,577 | 10/1989 | Chamzas | 358/133 |
| 4,903,125 | 2/1990 | Parker | 358/140 |
| 4,914,675 | 4/1990 | Fedele | 375/25 |
| 4,961,204 | 10/1990 | Tanaka et al. | 375/25 |
| 5,060,229 | 10/1991 | Tyrell et al. | 370/110.1 |

OTHER PUBLICATIONS

A. Artieri et al. "A Chip Set Core for Image Compression", SGS-Thomson Microelectronics, Image Processing Unit, 17, avenue des Martyrs-B.P. 217, 38019 Grenoble Cedex, France.

International Organization for Standardization, ISO-IEC JTCl/SC2/WG11, "Coding of Moving Pictures and Associated Audio", MPEG Video Committee Draft, MPEG 90/176 Rev. 2, Dec. 18, 1990.

Digicipher HDTV System, General Instrument Corporation, Videocipher Division, 6262 Lusk Blvd., San Diego, Calif., Jun. 8, 1990.

J. Zdepski et al., "Prioritized Packet Transport of VBR CCITT H.261 Format Compressed Video on a CSMA/CD Lan" presented at the Third Annual Workshop on Packet Video, Morristown, N.J. Mar. 22, 1990.

Primary Examiner—James J. Groody
Assistant Examiner—Michael L. Lee
Attorney, Agent, or Firm—Joseph S. Tripoli; Eric P. Herrmann; Ronald H. Kurdyla

[57] ABSTRACT

A vide signal encoding system includes apparatus for segmenting encoded video data into transport blocks for signal transmission. The transport block format enhances signal recovery at the receiver by virtue of providing header data from which a receiver can determine re-entry points into the data stream on the occurrence of a loss or corruption of transmitted data. The number of re-entry points are maximized by providing secondary transport headers embedded within encoded video data in respective transport blocks.

17 Claims, 10 Drawing Sheets

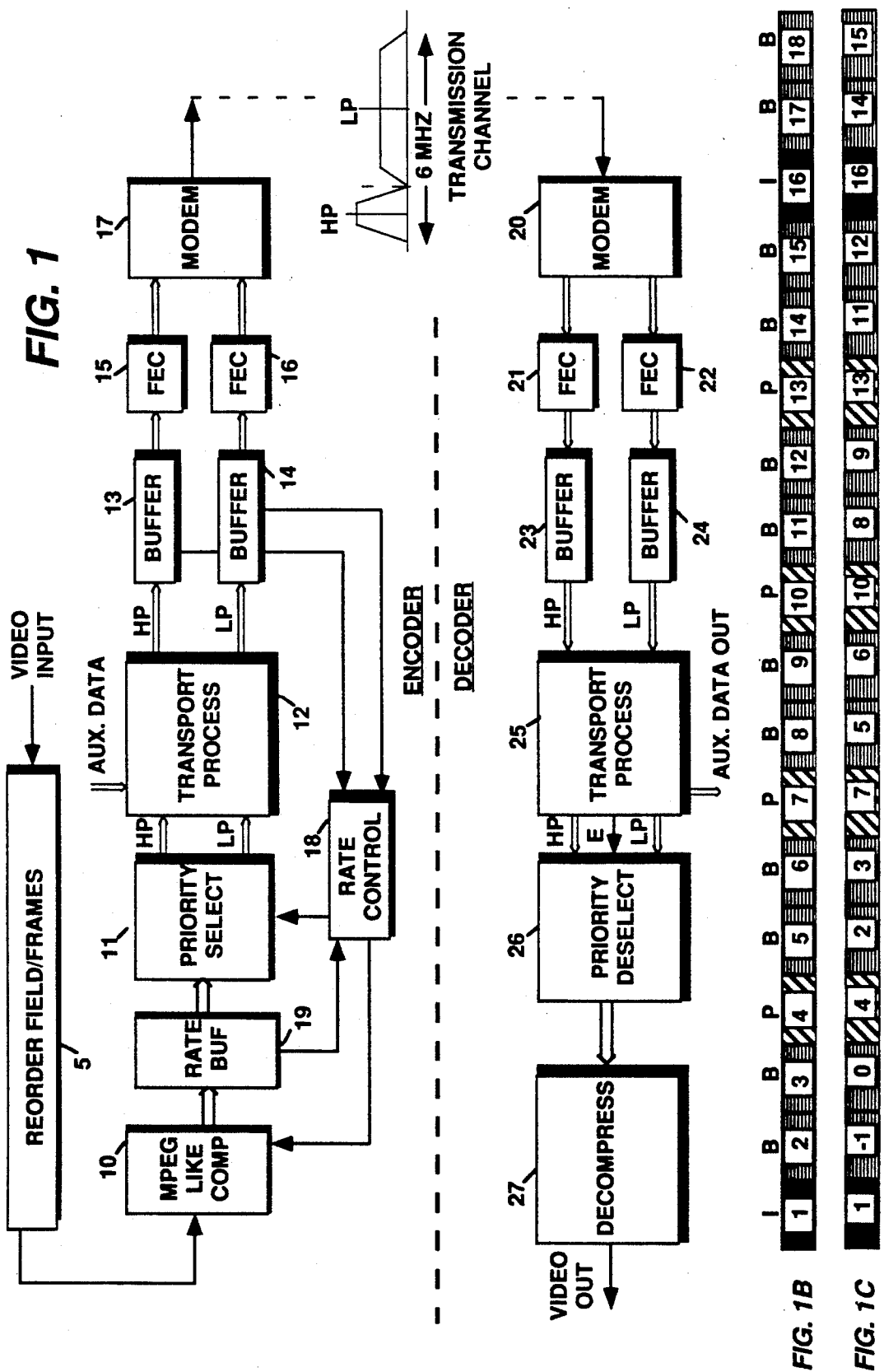

APPARATUS FOR SEGMENTING ENCODED VIDEO SIGNAL FOR TRANSMISSION

This is a continuation of application Ser. No. 661,982, filed Feb. 27, 1991.

This invention relates to a system for providing and processing a high definition television (HDTV) signal, and more particularly to apparatus for segmenting compressed video data into blocks of data for transmission.

BACKGROUND OF THE INVENTION

Digital high definition video data may be successfully transmitted over terrestrial television channels, as described herein, by partitioning the video data between high and low priority information, and quadrature amplitude modulating the high and low priority data on separate carriers respectively. The modulated carriers are included in a 6 MHZ frequency spectrum and then the combined signal is translated to occupy a standard broadcast channel spectrum. The high priority data is transmitted with relatively high power and the low priority data with relatively low power. High priority data is that video data which is sufficient to reproduce an image, albeit of lesser quality than a high definition image.

Nominally digital video data is compressed and transmitted in layered coded format including header data identifying respective portions of the data so that, upon loss of some data during transmission, the receiver can find an appropriate re-entry point in the received data. In general, however, simply providing header data is not sufficient to enable the receiver to produce acceptable images, since it may be the header data which is lost or corrupted during transmission. In such instances the receiver will tend to lose synchronization with respect to the normal cyclical decoding sequence.

In accordance with the present invention extra protection against lost or corrupted data from confusing decoding at the receiver, is provided by arranging coded video data in transport blocks. The transport blocks include additional header data identifying relatively small portions of the video data. In addition the header data of the transport blocks includes pointers which indicate data re-entry points within respective transport blocks.

The present invention is directed to circuitry for forming video data transport blocks at a video signal encoder and circuitry for depacketizing the transport blocks at a video signal receiver.

For purposes of this disclosure the video data will be presumed to be compressed in MPEG like format. What is meant by "MPEG like" is a coding format similar to the standardized coding format being established by the International Organization for Standardization. The standard is described in the document "International Organization for Standardization", ISO-IEC JT(1/SC2/WG1), Coding of Moving Pictures and Associated Audio, MPEG 90/176 Rev. 2, Dec. 18, 1990, which document is incorporated herein by reference for description of the general code format.

The MPEG standard transmits 240 lines (NTSC) per frame non-interlaced, which is typically accomplished by encoding only the odd or even fields of an interlaced source video signal. For transmitting HDTV signals the standard is modified to provide, for example 480 lines per field, and both the odd and even fields are transmitted. In addition the number of pixels per line is increased to for example 1440. Conceptually these changes only affect the data rate and do not affect the compression philosophy.

SUMMARY OF THE INVENTION

The present invention is apparatus for segmenting compressed video codeword data into transport blocks. In a first embodiment the apparatus is responsive to codewords CW representing compressed video data, and codewords TYPE associated with respective codewords CW provided by video compression circuitry. The codewords TYPE indicate the type of data represented by respective codewords. A transport control circuit, responsive to the codewords TYPE selects ones of the video data header data codewords and extracts video data identifying indicia to form transport block headers which headers are temporarily stored. In addition, an amount of video data corresponding to the amount of service information included in respective transport blocks, is temporarily stored in a buffer memory. The transport control circuit then forms a signal sequence consisting of transport headers followed by video data. The combined transport headers and video data are applied to a error encoding circuit which generates an error detection code for the combined data and appends the error detection code to the combined data, thereby forming complete transport blocks.

In a further embodiment apparatus at the receiver includes circuitry which, in cooperation with the received error detection codes, examines respective transport blocks for bit errors, and generates an error indication upon detection of any such errors. The error checked data is coupled to circuitry which thereafter extracts at least a portion of the transport headers. The extracted transport header data, video data exclusive of the extracted transport header data, and the error indication are respectively provided to further decoding circuitry in the receiver.

BRIEF DESCRIPTION OF THE DRAWINGS

FIG. 1 is a block diagrams of an HDTV encoding/decoding system embodying the invention.

FIGS. 1B-1C are pictorial representations of sequences of fields/frames of encoded video signal useful in describing the invention.

DETAILED DESCRIPTION

Figure 3A:
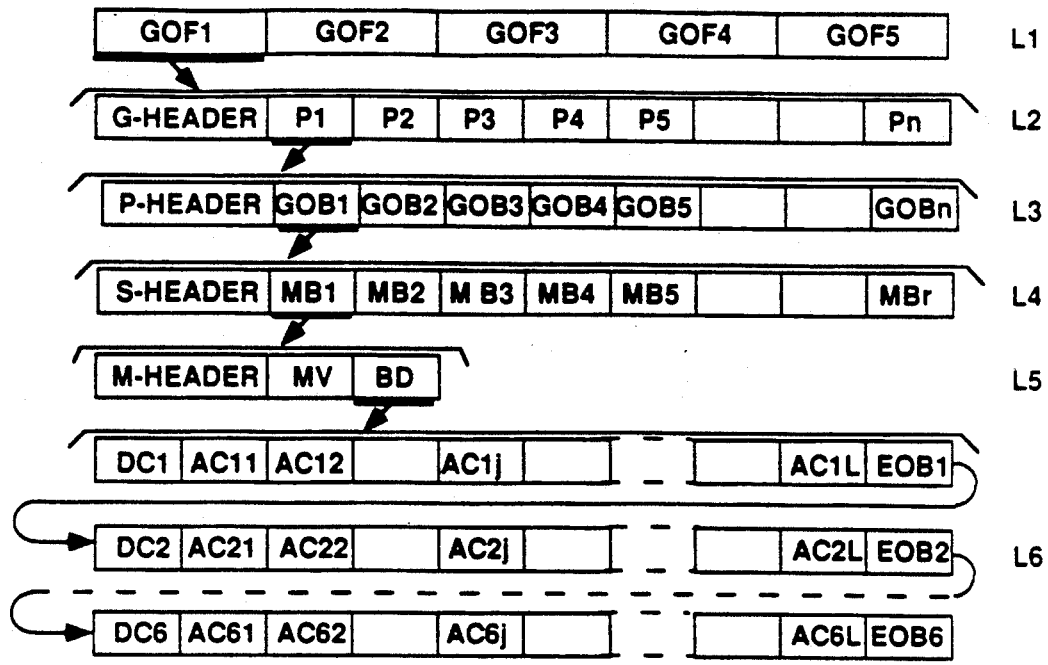
FIG. 3A is a generalized pictorial representation of the data format provided by the compression circuit of FIG. 3.

An exemplary HDTV system which may be supported by the present invention includes a two-to-one interlaced signal of 1050 lines at 59.94 frames per second. The nominal active picture has 960 lines of 1440 pixels each with an aspect ratio of 16×9. The signal is transmitted using two 64 quadrature amplitude modulated (64-QAM) carriers, frequency multiplexed in a 6 MHz transmission band. The nominal total bit rate, including video, audio and auxiliary data, is 26–29 Mbps.

The video signal is initially compressed in conformance with an MPEG-like format, albeit using both fields of each frame and with higher pixel density. Thereafter the MPEG-type signal codewords are parsed into two bit streams in accordance with the relative importance of the respective codeword types. The two bit streams are independently processed to apply error correction overhead bits, and then caused to QAM respective carriers. The modulated carriers are combined for transmission. The bit streams of relatively greater and lesser importance are designated high priority (HP) and low priority (LP) channels respectively. The high priority channel is transmitted with approximately twice the power as the lower priority channel. The high priority/low priority information ratio is approximately one-to-four. The approximate net data rates after forward error correction are 4.5 Mbps HP and 18 Mbps LP.

FIG. 1 illustrates an exemplary HDTV encoding/decoding system according to the invention. FIG. 1 shows the system processing a single video input signal, but it is to be understood that the luminance and chrominance components are compressed separately, and that the luminance motion vectors are utilized for generating compressed chrominance components. The compressed luminance and chrominance components are interleaved to form macroblocks before codeword priority parsing.

A sequence of image fields/frames as per FIG. 1B is applied to circuitry 5 which reorders the fields/frames according to FIG. 1C. The reordered sequence is applied to a compressor 10 which generates a compressed sequence of frames that are coded according to an MPEG-like format. This format is hierarchial and is illustrated in abbreviated form in FIG. 3A.

Figure 2:
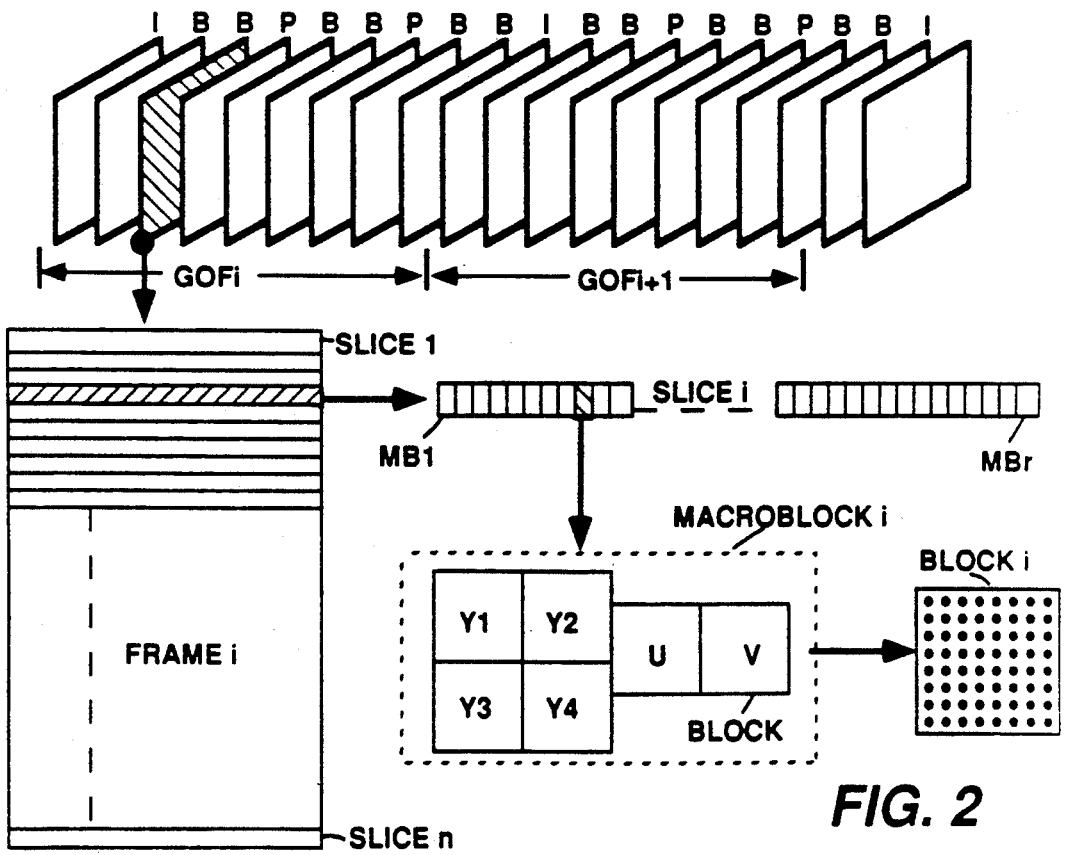
FIG. 2 is a pictorial representation of a macroblock of data provided by the compression circuit of FIG. 3.

The MPEG hierarchical format includes a plurality of layers each with respective header information. Nominally each header includes a start code, data related to the respective layer and provision for adding header extensions. Much of the header information (as indicated in the referenced MPEG document) is required for synchronization purposes in an MPEG systems environment. For purposes of providing a compressed video signal for a digital HDTV simulcast system, only descriptive header information is required, that is start codes and optional extensions may be excluded. The respective layers of the coded video signal are illustrated pictorially in FIG. 2.

When referring to the MPEG-like signal produced by the present system what is meant is that a) successive fields/frames of video signal are encoded according to an I, P, B coding sequence, and b) coded data at the picture level is encoded in MPEG-like slices or group of blocks albeit that the number of slices per field/frame may differ and the number of macro blocks per slice may differ. An I coded frame is one which is intraframe compressed such that only I frame compressed data is required to reproduce an image. P coded frames are coded according to a forward motion compensated predictive method, that is the P frame coded data is generated from the current frame and an I or P frame occurring before the current frame. B coded frames are coded according to a bidirectionally motion compensated predictive method. The B coded frame data is generated from the current frame and from I and P frames occurring both before and after the current frame.

The coded output signal of the present system is segmented in groups of fields/frames (GOF) illustrated by the row of boxes L1 (FIG. 3A). Each GOF (L2) includes a header followed by segments of picture data. The GOF header includes data related to the horizontal and vertical picture size, the aspect ratio, the field/frame rate, the bit rate, etc.

The picture data (L3) corresponding to respective fields/frames includes a header followed by slice data (L4). The picture header includes a field/frame number and a picture code type. Each slice (L4) includes a header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Note each macroblock is comprised of 6 blocks, including four luminance blocks, one U chrominance block and one V chrominance block. See FIG. 2. A block represents a matrix of pixels, e.g., 8×8 over which a discrete cosine transform (DCT) is performed. The four luminance blocks are a 2×2 matrix of contiguous luminance blocks representing, e.g., a 16×16 pixel matrix. The chrominance (U and V) blocks represent the same total area as the four luminance blocks. That is the chrominance signal is subsampled by a factor of two horizontally and vertically relative to luminance, before compression. A slice of data corresponds to data representing a rectangular portion of an image corresponding to an area represented by a contiguous group of macroblocks.

The block coefficients are provided one block at a time with the DCT, DC coefficient occurring first followed by respective DCT AC coefficients in the order of their relative importance. An end of block code EOB is appended at the end of each successively occurring block of data.

The amount of data provided by the compressor 10 is determined by the rate control element 18. As is well known compressed video data occurs at variable rates, and desirably, data is transmitted at a constant rate equivalent to the channel capacity, to realize efficient use of the channel. Rate buffers 13 and 14 perform the variable to constant data rate translation. It is also known to adjust the amount of data provided by the compressor in accordance with the level of occupancy of the buffers. Thus the buffers 13 and 14 include circuitry to indicate their respective level of occupancy. These indications are applied to the rate controller 18 to adjust the average data rate provided by the compressor 10. The adjustment is typically accomplished by adjusting the quantization applied to the DCT coefficients. Quantization levels may be different for the different types of frame compression. Details of an exemplary method for determining quantization levels may be found in application Ser. No. 494,098, filed Mar. 15, 1990 and entitled "Digital Signal Coding With Quantization Level Computations," (abandoned) which application is included herein by reference.

Compressed video data hierarchically formated as indicated in FIG. 3A is coupled to a priority select element 11, which parses the coded data between a high priority channel HP and a low priority channel LP. High priority information is that information, the loss or corruption of which, would create the greatest degradation in reproduced images. Stated conversely, it is the least data needed to create an image, albeit less than a perfect image. Low priority information is the remaining information. The high priority information includes substantially all of the header information included in the different hierarchical levels plus the DC coefficients of the respective blocks and a portion of the AC coefficients of the respective blocks (level 6, FIG. 3A).

The ratio of HP and LP data at the transmitter is approximately 1:4. At the transport processor auxiliary data is added to the signal to be transmitted. This auxiliary signal may include digital audio signal and, e.g., teletext data. In this example at least the digital audio will be included in the HP channel. The average amount of the auxiliary data included in the HP channel is calculated and compared to the expected statistical average of the compressed video information. From this the ratio of high and low priority compressed video information is calculated. The priority select element 40 parses the data provided by the compressor 10 according to this ratio.

The HP and LP compressed video data are coupled to a transport processor 12 which a) segments the HP and LP data streams into transport blocks, b) performs a parity or cyclic redundancy check on each transport block and appends the appropriate parity check bits thereto, and c) multiplexes the auxiliary data with the HP or LP video data. The parity check bits are utilized by the receiver for isolating errors in conjunction with synchronizing header information and for providing error concealment in the event of uncorrectable bit errors in the received data. Each transport block includes a header including information indicative of the type of information included in the block, e.g., video audio and pointers to the starting points of contiguous like data.

The HP and LP data streams from the transport processor 12 are applied to the respective rate buffers 13 and 14, which convert the variable rate compressed video data from the processor 12 to data occuring at a substantially constant rate. The rate adjusted HP and LP data are coupled to forward error encoding elements 15 and 16 which a) perform REED SOLOMON forward error correction encoding independently to the respective data streams; b) interleave blocks of data to preclude large error bursts from corrupting a large contiguous area of a reproduced image; and c) appends, e.g., Barker codes to the data for synchronizing the data stream at the receiver. Thereafter the signals are coupled to a transmission modem wherein the HP channel data quadrature amplitude modulates a first carrier and the LP channel data quadrature amplitude modulates a second carrier displaced from the first carrier by approximately 2.88 MHz. The 6 dB bandwidth of the modulated first and second carriers are respectively about .96 MHz and 3.84 MHz. The modulated first carrier is transmitted with approximately 9 dB greater power than the modulated second carrier. Since the HP information is transmitted with greater power it is much less prone to corruption by the transmission channel. The HP carrier is located in the portion of the frequency spectrum of an, e.g., NTSC TV, transmission channel normally occupied by the vestigial sideband of a standard NTSC TV signal. This portion of the signal channel is normally significantly attenuated by the Nyquist filters of standard receivers and thus HDTV signals with this transmission format will not introduce cochannel interference.

At the receiver the transmitted signal is detected by the modem 20 which provides two signals corresponding to the HP and LP channels. These two signals are applied to respective REED SOLOMON error correcting decoders 21 and 22. The error corrected signals are coupled to rate buffers 23 and 24 which receive data at a variable rate commensurate with the requirements of the subsequent decompression circuitry. The variable rate HP and LP data is applied to a transport processor 25 which performs the inverse process of the processor 12. In addition it performs a degree of error detection responsive to the parity check bits included in the respective transport blocks. The transport processor 25 provides separated auxiliary data, HP data, LP data and an error signal E. The latter three signals are coupled to a priority deselect processor 26 which reformats the HP and LP data into an hierarchically layered signal which is applied to a decompressor 27. The decompressor 27 performs the inverse function of the compressor 27.

Figure 3:
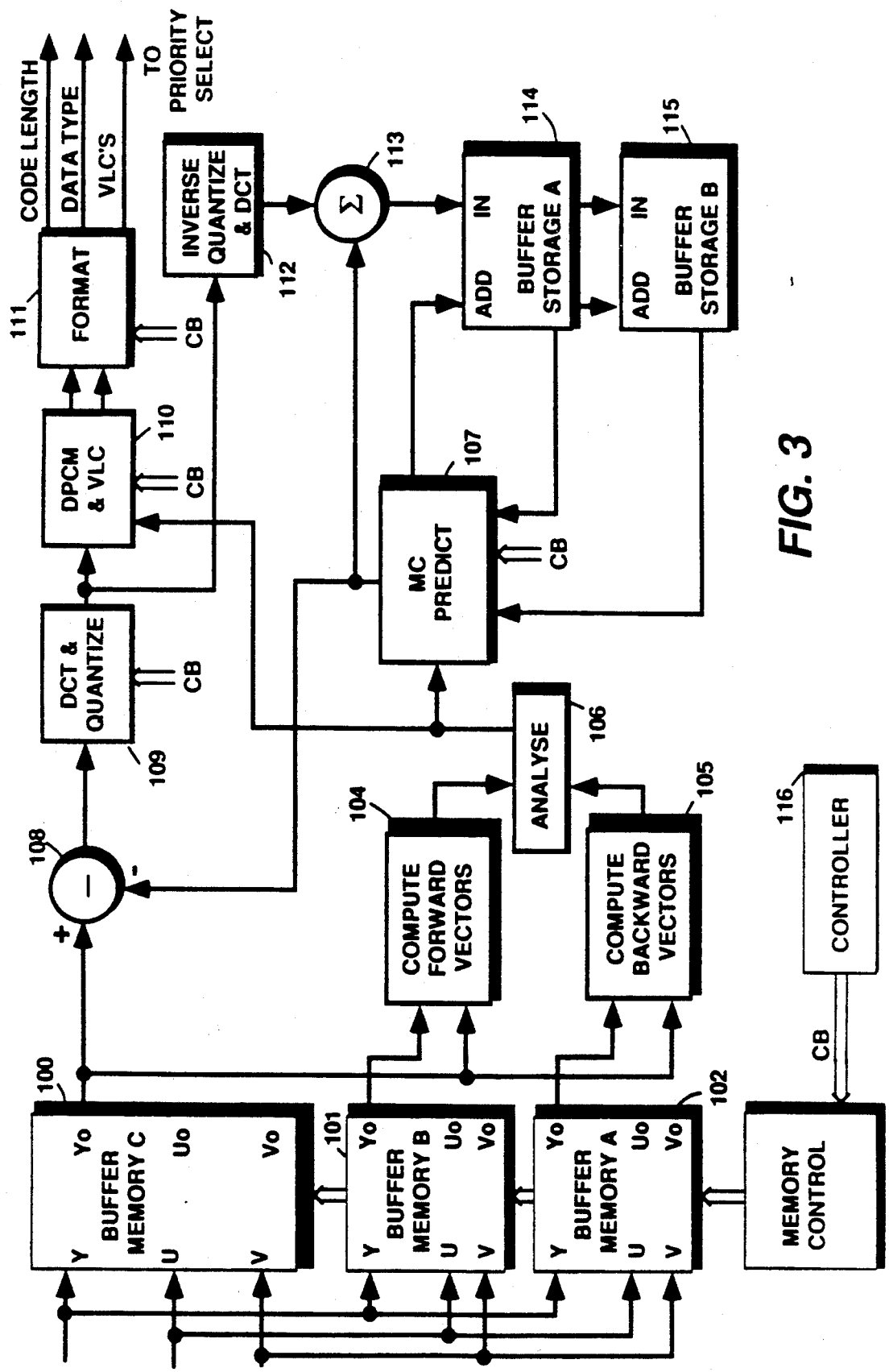
FIG. 3 is a block diagram of a video signal compression circuit.

FIG. 3 illustrates an exemplary compressor apparatus which may be utilized for element 10 of FIG. 1, for providing hierarchically layered compressed video data. The apparatus shown only includes the circuitry required to generate compressed luminance data. Similar apparatus is required to generate compressed chrominance U and V data. In FIG. 3 there are elements 104 and 105 designated as elements for computing forward and backward motion vectors respectively. Since whether a motion vector is forward or backward depends only upon whether the current field is analyzed with respect to a prior or succeeding field, both elements are realized with similar circuitry, and in fact both elements 104 and 105 alternate on a field/frame basis between generating forward and backward vectors. The elements 104 and 105 may be realized using integrated circuits of the type designated STI 3220 MOTION ESTIMATION PROCESSOR available from SGS-THOMSON MICROELECTRONICS. In order to achieve the necessary processing rates each of the elements 104 and 105 comprise a plurality of such integrated circuits operating simultaneously on different areas of respective images.

Element 109 designated DCT & Quantize performs the discrete cosine transform and quantization of transform coefficients and may be realized using integrated circuits of the type designated STV 3200 DISCRETE COSINE TRANSFORM available from SGS-THOM- SON MICROELECTRONICS. Element 109 will also be realized with a plurality of such devices operated in parallel to concurrently process different areas of the image.

Refer to FIG. 1C and assume that frame 16 is currently available. Previously occuring P frame 13 has been snatched and stored in the buffer memory B 101. In addition a generated predicted frame 13 has been stored in one of the buffer storage elements 114 or 115. As frame 16 occurs it is stored in buffer memory A, 102. In addition frame 16 is applied to a working buffer memory 100. As frame 16 occurs, appropriate image blocks of data are coupled from the memory 100 to the minuend input of a subtracter 108. During I frame compression the subtrahend input of the subtracter 108 is held at a zero value so that data passes through the subtracter 108 unaltered. This data is applied to the DCT and quantizer element 109 which provides quantized transform coefficients to elements 110 and 112. Element 112 performs inverse quantization and inverse DCT transformation of the coefficients to generate a reconstructed image. The reconstructed image is applied via an adder 113 to, and stored in, one of the buffer storage elements 114 and 115 for use in compressing subsequent B and P frames. During compression of I frames no information is added (by adder 113) to the reconstructed image data provided by element 112.

Element 110 performs two functions during I frame compression. First it performs differential (DPCM) coding of the DC coefficients generated by element 109. It then variable length encodes (VLC) the differentially coded DC coefficients and zero run and variable length encodes the AC coefficients generated by element 109. The VLC codewords are applied to a formatter 111 which segments the data and appends header information thereto in conformance with the layers illustrated in FIG. 3A. Coded data from element 111 is then passed to the priority select apparatus. Each of the elements 109, 110 and 111 are controlled by a system controller 116 to cyclically perform the appropriate operations at the appropriate times.

After frame 16 a "B" frame (14) occurs and is loaded into buffer memory 100. Data from frame 14 is coupled to both of elements 104 and 105. Element 104, responsive to frame 14 data from memory 100 and frame 13 data from memory 101, calculates forward motion vectors for respective blocks of 16×16 pixels of image data. It also provides a distortion signal which is indicative of the relative accuracy of the respective forward motion vectors. The forward motion vectors and the corresponding distortion signals are coupled to an analyzer 106.

Element 105, responsive to frame 14 data from memory 100 and I frame 16 data from memory 102, generates backward motion vectors and corresponding distortion signals which are also coupled to the analyzer 106. Analyzer 106 compares the distortion signals against a threshold, and if both exceed the threshold, provides both the forward and backward motion vectors as the motion vector, and also provides a corresponding signal related to the ratio of the distortion signals. Upon reconstruction predicted images are generated using both forward and backward vectors and corresponding frame data from which derived. An interpolated frame is generated from the forward and backward predicted frames in accordance with the ratio of distortion signals. If the distortion signals for both the forward and backward motion vectors are less than the threshold, the motion vector with the corresponding lesser value distortion signal is selected as the block motion vector.

After the motion vector has been determined, it is applied to the motion compensated predictor 107 which accesses the appropriate data block defined by the vector from the previously regenerated frame 16 or frame 13 or both, stored in the storage elements 114 and 115. This data block is applied to the subtrahend input of the subtracter 108 wherein it is subtracted on a pixel by pixel basis from the corresponding block of pixel data from the current frame 14 provided by the buffer memory 100. The differences or residues are then encoded in element 109 and the coefficients applied to element 110. The corresponding block vector is also applied to element 110. For encoded B and P frames, the DC coefficients are not differentially encoded, but both the DC and AC coefficients are variable length encoded. The motion vectors are differentially encoded and then the differentially encoded vectors are variable length encoded. The coded vectors and coefficients are then transferred to the formatter 111. The encoded B frames are not inverse quantized and inverse transformed in element 112 since they are not used for subsequent encoding.

P frames are similarly encoded except that only forward motion vectors are generated. For example P frame 19 is encoded with motion vectors associating corresponding blocks of I frame 16 and P frame 19. During encoding of P frames, element 112 provides corresponding decoded residues and element 107 provides the corresponding predicted P frame. The predicted frame and the residues are added in adder 113 on a pixel-by-pixel basis to generate the reconstructed frame which is stored in the one of storage elements 114 and 116 not containing the frame information from which the predicted P frame is generated. The reconstructed and stored P frame is used for encoding subsequent B frames. For both P and B field/frames it should be noted that DCT's are performed on a block basis (e.g., a matrix of 8×8 pixels), but motion vectors are calculated for macroblocks (e.g., a 2×2 matrix of luminance of blocks or a 16×16 matrix of pixels).

Figure 4:
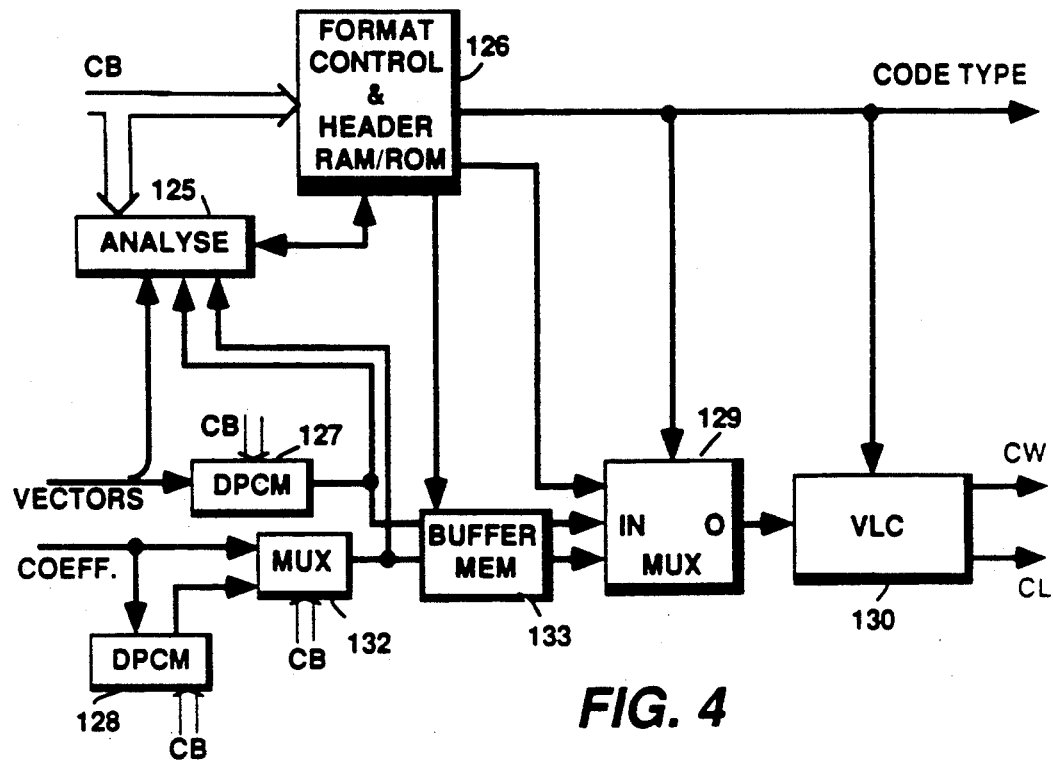
FIG. 4 is a block diagram of exemplary circuitry which may be utilized for the formatting circuit 111 of FIG. 3.

FIG. 4 shows exemplary circuitry in block form which may be used to implement the functions of elements 110 and 111 of FIG. 3. The output format of this circuitry diverges from that normally provided by an MPEG type encoder in that an MPEG output is a bit-serial data stream, but the data provided by the exemplary circuitry of FIG. 4 is in parallel-bit word format. This format is selected to facilitate the implementation of both the priority select processor and the transport processor. In addition two extra signals are provided which define the code type of each output codeword, CW, and the length, CL, of each codeword.

In FIG. 4 motion vectors from the analyzer 106 (FIG. 3) are differentially encoded in the DPCM element 127 on a slice basis and coupled to a multiplexer 129 via a buffer memory 133. Transform coefficients from the transform element 109 are coupled to a multiplexer 132 and a differential encoding element DPCM 128. Differentially encoded coefficients from the DPCM 128 are coupled to a second input of the multiplexer 132. During encoding of P or B frames all of the coefficients are passed directly through the multiplexer 132. During encoding of I frames, the DC coefficients are selectively differentially encoded by the DCPM 128. The differentially encoded DC coefficients and the non-differentially encoded AC coefficients are multiplexed by the multiplexer 132 and coupled to a second input of the multiplexer 129 via the buffer memory 133. Header information from a format control and header element 126 are coupled to a third input of the multiplexer 129. Element 126 includes stored information and control circuitry to a) provide the requisite header information for the different code layers (FIG. 3A) and to b) provide control signals to time division multiplex the header information, motion vectors and the transform coefficients via multiplexer 129. Element 126 is responsive to the system control circuitry via the control bus CB to provide the appropriate headers corresponding to picture size, rate, picture coding type quantizer parameters, etc. Certain of the header information is calculated by element 126 in conjunction with an analyzer 125. In the MPEG-type format much of the header information (e.g., level 5 of FIG. 3A) is variable such as the type of block encoding, the type of motion vectors, whether a block has zero valued motion vectors and or whether all coefficients in a block are zero values. The vector information and coefficient information is applied to the analyzer 125 to determine these types of header information. Whether a motion vector is a forward, backward and or zero valued is directly determinable by examination of the vectors. Whether all coefficients in a block are zero valued is determinable by simply accumulating the magnitudes of the vectors included in a block. Once the type of variable header data is determined, it is assigned a codeword and provided to the multiplexer 129 at the appropriate time. The element 126 also provides information relating to the codeword type currently being multiplexed, i.e., header information, motion vector information, DC coefficients, AC coefficients.

The time division multiplexed information is coupled to a variable length encoder 130 which is also controlled by element 126. In the figure the VLC control is shown provided by the codeword type signal. The different code types are variable length coded according to different VLC code tables and thus it is appropriate to utilize the code type signal for such control.

The VLC 130 may include a zero-run encoder for encoding zero runs of the AC coefficients and a plurality of Huffman code tables addressed by the respective codewords passed by the multiplexer 129 for variable length encoding the transform coefficients and the motion vectors. The particular table utilized is enabled by the code type signal. Each of the code tables may include corresponding tables programmed with the code lengths of the respective variable length codewords. The codewords CW and the code lengths CL are provided concurrently on separate busses in parallel-bit format. In general the header information is not variable length coded and is passed unaltered by the VLC 130. However, the VLC 130 includes code length tables responsive to the code type signal to provide the code lengths of the header codewords. Alternatively, a bit counter may be included in the VLC to count the number of bits of these data.

The element 126 also controls the writing and reading of data provided to and from the buffer memory 133.

Figure 5:
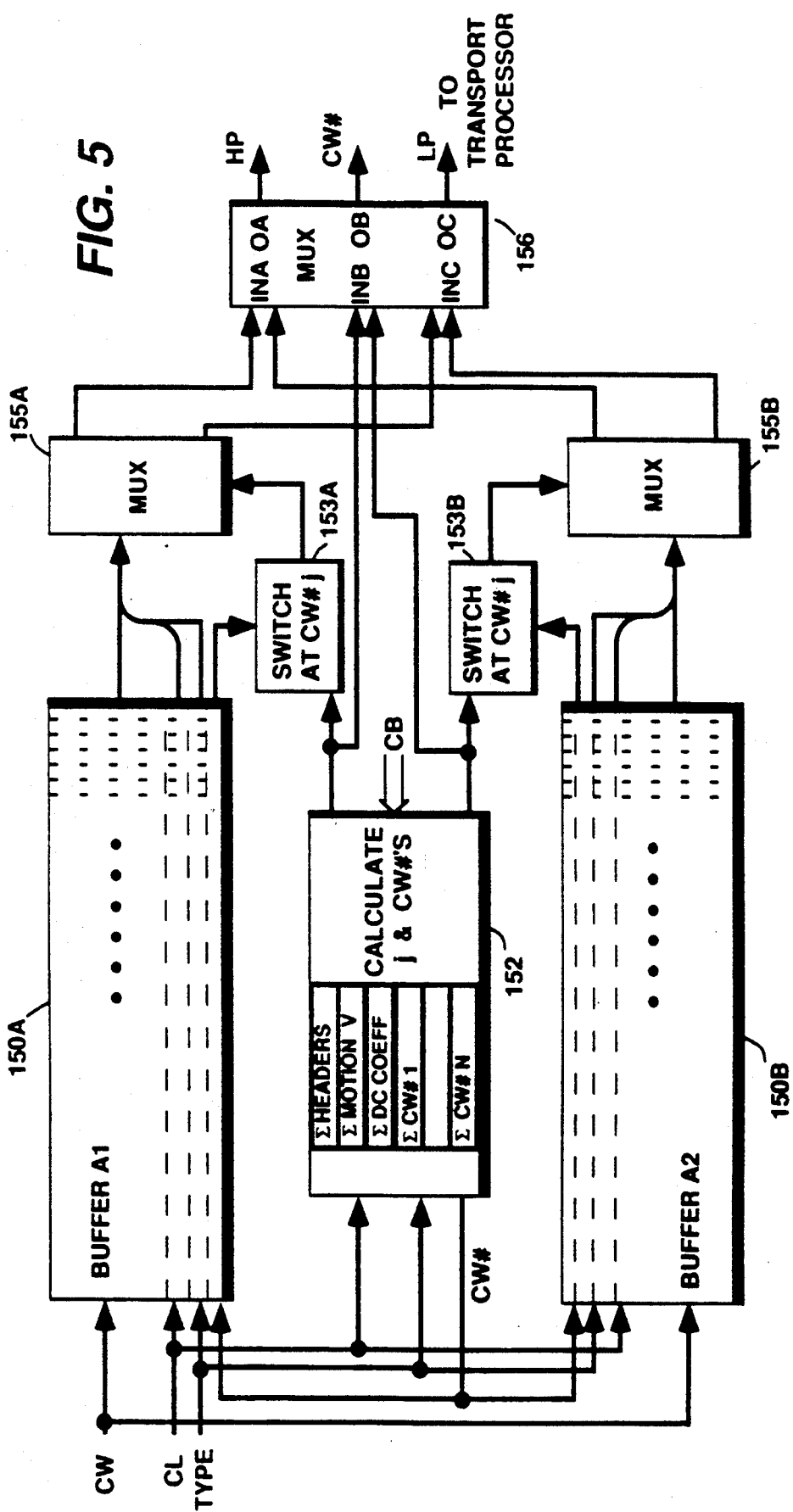
FIG. 5 is a block diagram of exemplary circuitry which may be implemented for the Priority Select circuitry of FIG. 1.

FIG. 5 illustrates exemplary apparatus for performing the priority selection process. This apparatus may operate in several modes. For example, data may be prioritized on an equal basis for the different field/frame types, or on an unequal basis for the different field/frame types. In the latter instance assume that the HP channel passes 20 percent of the total data transmitted and that three percent of the HP channel is consumed by auxiliary data. If the video data is quantized for maximum transmission channel efficiency, 17.53% of the video data may be allocated to the HP channel. In the former instance, the high priority data for the I, P and B frames may be assigned in for example, the ratio of $\alpha:\beta:1$ respectively. The values $\alpha$ and $\beta$ may be user selectable and/or determined on a statistical basis from the amount of code data from prior encoded frames.

Figure 5A:
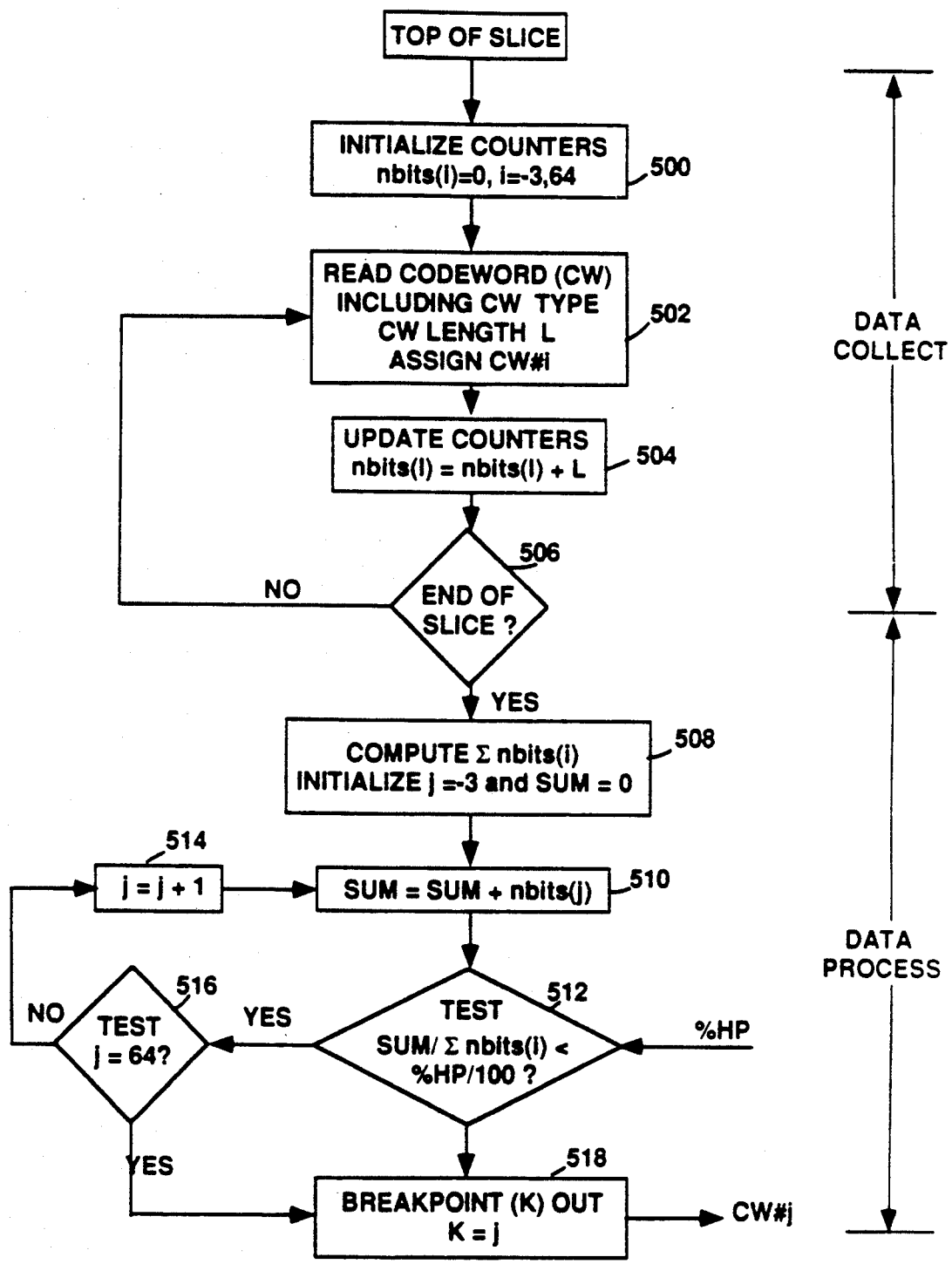
FIG. 5A is a flow diagram illustrating the operation of the FIG. 5 analyzer.

Refer to FIGS. 5 and 5A. In the following description, numbers in square brackets correspond to process blocks of FIG. 5A. Data from the variable length encoder 130 is coupled to respective input ports of two buffer memories 150A and 150B and to a data analyzer 152. The respective buffers include enough memory to store for example a slice of data. The buffers 150A and 150B are operated in "ping-pong" fashion to alternately write slices of data and read slices of data. Thus while buffer 150A writes data from, e.g., slice n, buffer 150B reads data from slice n−1.

As data is written to a particular buffer, the analyzer 152 generates a codeword number CW#i for each codeword and stores the CW#i in association with the corresponding codeword. The analyzer also calculates the point, or codeword, at which the data should be split between HP and LP channels. The calculation is determined for the amount of data stored in the buffer. There are four general types of data including Header Data, Motion Vectors, DC coefficients and AC coefficients. The DC and AC coefficients over a block occur in the order of DC coefficient first followed by codewords representing the AC coefficients in generally descending order of importance. The total number of bits are counted for all the codewords in the buffer. Then the codeword at which the sum of bits is just greater than the HP percentage is identified by a codeword number, CW#j. This number is applied to a switching element 153A (153B), and used to control the multiplexer 155A (155B). After the codeword number CW#j is identified, the codewords, codelength data, codeword type data and codeword numbers are read in parallel from the buffer 150A (150B). The codewords, codelengths and codetypes are applied to the input of a multiplexer 155A (155B), and the codeword numbers are applied to an input of the switching element 153A (153B). As the data is read from the buffer, the switching element 153A (153B) compares the codeword numbers to the calculated number CW#j. For all codeword numbers less than or equal to CW#j, the switching element provides a control signal which conditions the multiplexer 155A (155B) to pass the corresponding data to the HP channel via a further multiplexer 156. For codeword numbers greater than CW#j, the multiplexer 155A (155B) is conditioned to pass the corresponding data to the LP channel via multiplexer 156. The multiplexer 156 is conditioned to pass HP and LP data provided by the buffer 150A, (150B) which is currently being read.

The analyzer 152 is responsive to the codelength signals, and the code type signals. Responsive to the code type signals, the analyzer generates [502] codeword numbers for each occurring codeword. For example, each codeword representing header information is assigned the number (−2). Each codeword representing motion vectors and DC coefficients are assigned the numbers (−1) and (0) respectively. Successive AC codewords are assigned ascending integers i from 1 to n on a block-by-block basic.

The analyzer 152 also includes an accumulator which, responsive to the codelength and type signals, independently sums the number of bits of the codewords of each code type entered in the buffer 150A (150B). These sums are added [504] to provide the total number of codeword bits contained in the buffer. The total sum is multiplied by the decimal equivalent of the percent to be allotted to the HP channel to produce a check sum [512]. Thereafter the respective code type sums are sequentially added [508] in ascending order of codeword number CW#i to produce partial sums. Each partial sum is compared [512] with the check sum until the partial sum exceeds the check sum. The codeword number CW#j associated with the immediately previous partial sum is the last codeword within a block to be assigned to the HP channel [512-518]. All succeeding codewords, i.e., CW#j+1 to CW#n, for respective blocks are assigned to the LP channel.

Figure 6:
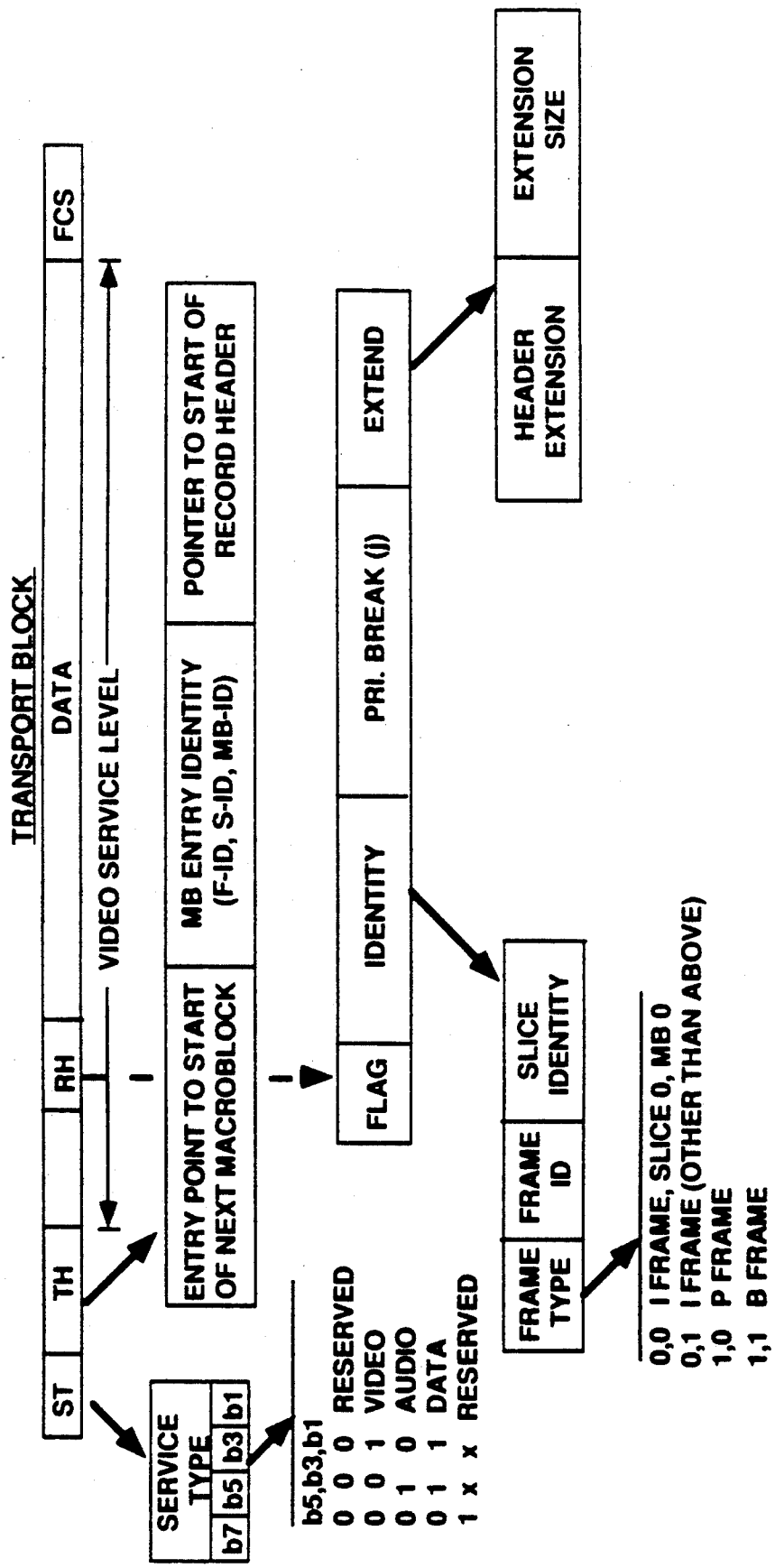
FIG. 6 is a diagram of the signal format provided by the transport processor 12 of FIG. 1.

Respective HP and LP data from the priority selector is arranged in transport blocks designed to enhance signal recovery and error concealment at the receiver. The transport block format is illustrated in FIG. 6. An exemplary HP transport block includes 1728 bits and an LP transport block includes 864 bits. Respective transport blocks may include more or less than a slice of data. Thus a particular transport block may include data from the end of one slice and data from the beginning of the next subsequent slice. Transport blocks including video data may be interleaved with transport blocks containing other data, e.g., audio. Each transport block includes a service type header ST which indicates the type of information included in the respective transport block. In this example the ST header is an 8-bit word which indicates whether the data is HP or LP, and whether the information is audio, video or auxiliary data. Four bits of the 8-bit word are used to represent the ST information and four bits are used to provide Hamming parity protection of the ST information bits.

Each transport block includes a transport header TH immediately following the ST header. For the LP channel the transport header includes a 7-bit macroblock pointer, an 18-bit identifier and a 7-bit record header (RH) pointer. The transport header of the HP channel includes only an 8-bit record header (RH) pointer. The macroblock pointer is used for segmented macroblock or record header components, and points to the start of the next decodable component. For example, if the particular transport block includes macroblock data associated with the end of slice n and the beginning of slice n+1, the data from slice n is placed adjacent the transport header and the pointer indicates that the next decodable data is adjacent the transport header TH. Conversely, if a record header RH is adjacent the TH, the first pointer indicates the byte position following the record header RH. A zero valued macroblock pointer indicates that the transport block has no macroblock entry point.

The transport block may include none, one or more than one record header, and their positions are variable within the transport block. A record header occurs at the beginning of each slice of macroblock data in the HP and LP channel. No record headers are included in transport blocks that include only video data header information. The record header (RH) pointer points to the byte position containing the start of the first record header in the transport block. Note, the first record header in a transport block is placed at a byte boundary. That is, if a variable length code precedes the record header, the variable length code may be bit-stuffed to insure that the start of the record header occurs at a bit position which is an integral number of bytes from the beginning of the transport block. The record headers are placed at byte boundaries to enable the decoder to locate them since they are embedded in a stream of concatenated variable length codewords. A zero valued RH pointer indicates that there are no record headers in the transport block. If both the record header pointer and the macroblock pointer are zero valued, this state indicates that the transport block includes only video data header information.

The 18-bit identifier in the LP transport header identifies the current frame type, the frame number (modulo 32), the current slice number, and the first macroblock contained in the transport block.

Following the transport header is either a record header, RH, or data. As indicated in FIG. 6 the record header for the video data in the HP channel includes the following information: A 1-bit FLAG which indicates if a header extension, EXTEND, is present. Following the FLAG is an identifier IDENTITY, which indicates a) the field/frame type I, B or P; b) a field/frame number (modulo 32) FRAME ID; and c) a slice number (modulo 64) SLICE IDENTITY. Following the identifier the record header includes a macroblock priority break point indicator, PRI BREAK (j). The PRI BREAK(j) indicates the codeword number CW#j, developed by the analyzer 152 of the priority selector, for dividing the codewords between the HP and LP channels. Lastly, an optional header extension may be included in the HP record header.

The record header incorporated in the LP channel includes only an identifier, IDENTITY, similar to the identifier implemented in the HP channel.

Each transport block is terminated with a 16-bit frame check sequence, FCS, which is calculated over all bits in the transport block. The FCS may be generated using a cyclic redundancy code.

Figure 7:
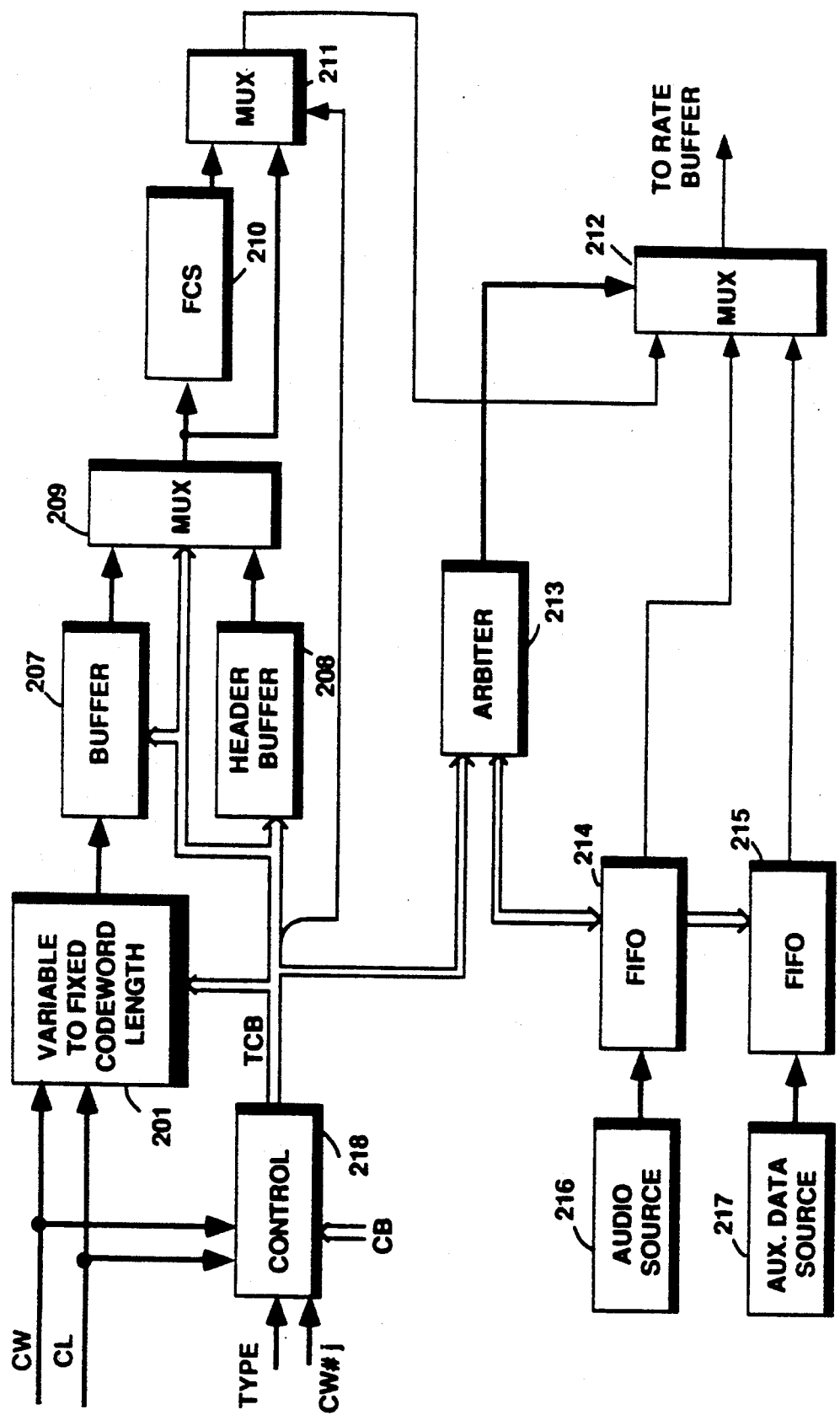
FIG. 7 is a block diagram of exemplary circuitry which may be implemented for the Transport Process circuit of FIG. 1.

FIG. 7 illustrates exemplary apparatus of the transport processor. In the figure an arbiter 213 interleaves, via a multiplexor 212, transport blocks of video data from a multiplexer 211, audio data from a memory 214 and auxiliary data from a memory 215. The audio data is provided in transport block form by the source 216 and applied to a first-in first-out memory 214. The auxiliary data is provided in transport block form by the source 217 to a first-in first-out memory 215. The formats of the audio and auxiliary data transport blocks may differ from the format of the video transport blocks, however all transport blocks will include a leading service type header, and preferably will be of equal length. The arbiter 213 responds to the level of occupancy of buffers 214, 215 and 207 in such fashion to insure that none of these buffers overflow.

The apparatus of FIG. 7 operates on one of the HP or LP signals and similar apparatus is required for the alternate signal. However, if all of the audio and auxiliary signal is HP data an arbiter for interleaving transport blocks will not be included in the LP transport block processor and vice versa.

In FIG. 7, codeword, CW, codelength, CL, and code type, TYPE, data from the priority selector are coupled to a transport controller 218, and the codewords and code type signal are coupled to a variable word length to fixed word length convertor 201. The convertor 201 packetizes the variable length codewords into, for example, 8-bit bytes in order to reduce the amount of storage space required of the rate buffers 13 and 14. The convertor 201 may be of the type described in U.S. Pat. No. 4,914,675. The fixed length words provided by the convertor 201 are temporarily stored in the buffer 207. As the variable length codewords are converted to fixed word lengths, the code types are monitored to locate the last data from respective slices to insure that the corresponding fixed length word does not include data from the next occurring slice. If this fixed length word is not filled with data bits it is bit stuffed. In addition this last fixed length word is indexed so that upon being read from the buffer 207 it is identified as the end of a slice. The index corresponds to the byte number relative to the first occurring fixed length word written in the buffer 207.

The transport controller 218 responds to the CW, CL, TYPE and CW#j data, and the end of slice index, to construct the transport block headers (ST, TH, RH) and applies these headers to a header buffer 208, which may be internal to the controller 218. The controller 218 may include dedicated registers for the particular types of transport header data, and when the appropriate video header data occurs (identified by the TYPE codes) this data is written to the respective registers. When formation of the respective transport headers is completed, they are written to the header buffer 208. The ST header data may be programmed in the controller 218 in Hamming coded format. The transport headers TH, ST and RH and the FCS are a fixed number of bytes. In forming the transport blocks the controller 218 reads the transport headers ST and TH from the buffer 208 and provides same via the multiplexer 209. If an end of slice index is not associated with the first most data in the buffer 207, data from the buffer 207 is read and provided via the multiplexer 209. Immediately after an end of slice indexed byte is read from the buffer 207, the header RH is read from the header buffer 208 and included in the output data stream via the multiplexer. The buffer 207 and multiplexer 209 are then condition to provide subsequent fixed length video data words. As respective header and video data are provided, the number of bytes are counted, and data output for a respective transport block is terminated when the count reaches the number of bytes allocated per transport block (less the number of bytes for the FCS code).

The transport blocks provided by the multiplexer 209 are coupled to one input of the multiplexor 211 and to the input terminal of a frame check sequence coder FCS 210, the output of which is coupled to a second input of the multiplexer 211. The FCS 210, responsive to transport block data forms two-byte error check codes for respective transport blocks. The multiplexer 211 is conditioned to pass respective transport blocks provided by the multiplexer 209, and then to append the 16-bit or two-byte FSC code from element 210 to the end of the transport block.

In the foregoing description of the transport processor it is assumed that all of the header information provided by the compressor 10 is included in the video data stream provided by the transport processor. It should be recognized that much of the video data header information is also included in the transport headers and as such provides redundant information. In an alternative arrangement, the controller 218 may preclude the converter 201 from accepting video header data which would be redundantly included in the transport block headers, thus enhancing the overall coding efficiency. At the receiver the excised video header data may be reconstructed from the transport block header information and reinserted in the video data stream.

At the receiver, detected signal is applied to forward error correction circuits 21 and 22 to perform error correction on the respective HP and LP signals. Error corrected data is then applied to the transport processor 25 via rate buffers 23 and 24. Even though the detected data has undergone error correction in the FEC circuits 21 and 22, certain errors occurring during signal transmission may not be correctable by the FEC circuits. If these errors are allowed to pass to the decompression circuitry, very objectionable corruption may occur in the reproduced image. To preclude such happenstance each transport block includes independent error detection codes to identify the occurrence of errors which pass through the FEC circuits, and responsive to such error indications the system may provide appropriate error concealment.

Figure 8:
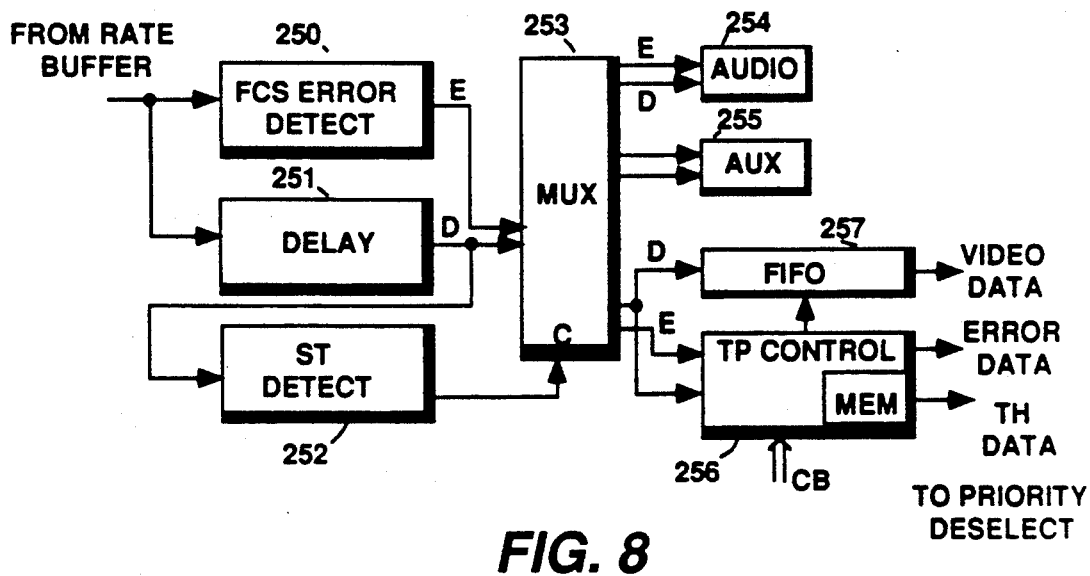
FIG. 8 is a block diagram of exemplary circuitry which may be implemented for the transport processor 25 of FIG. 1.

FIG. 8 illustrates the transport processor 25 included in the receiver portion of the system. Two such processors are required, one for the HP channel and one for the LP channel. If it is known a priori that audio or auxiliary data will always be excluded from a particular channel, the corresponding elements may be eliminated from such channel transport processor.

The FEC circuits 21 and 22 provide the received data in fixed length words corresponding to the fixed length words provided to the FEC circuits 15 and 16 of the encoder. As such the transport block header data occurs on byte boundaries which are either predetermined (ST, TH and FCS) or are identified (RH) by the transport header. This data format facilitates identification and processing of the requisite transport blocks.

In FIG. 8 data from the rate buffer 23 or 24 is applied to an FCS ERROR detector 250 and a delay element 251. Delay element 251 provides a delay of one transport block interval to allow the detector 250 to determine if any errors are present in the corresponding transport block. The detector 250 provides an error signal E indicating the presence or absence of errors in the transport block. The error signal is applied to the input port of a one-to-three demultiplexer 253. The delayed transport block data is also applied to the input port of the multiplexer 253. Delayed transport block data is also coupled to a service type detector (ST DETECT) 252, which examines the ST header and responsive thereto conditions the multiplexer 253 to pass the transport block data and corresponding error signal to the appropriate one of the audio, auxiliary or video signal processing paths. The detector 252 includes Hamming error correction circuitry and therefor, even though an error may be detected in a transport block, the ST code may still be relied upon because of its independent Hamming code protection/correction.

In the respective audio, auxiliary and video signal processing paths the error signal may be utilized in different ways to effect error concealment. In the video signal processing path the error signal may be utilized in alternative ways depending upon the error concealment circuitry included in the decompressor 27. In the simplest case assume that the decompressor 27 includes a display memory in which information is updated as information is decoded. If no information is received for a particular portion of an image, the corresponding portion of the display memory is not updated. Those image portions that are not updated are simply repeated in successive frames until new data is received. If it is assumed that error concealment by repeating information from frame-to-frame is acceptable, in the video signal processing path the error signal may be utilized to simply excise transport blocks with detected errors from the video data stream. Alternatively, for more sophisticated error concealment the transport block data may be retained but tagged with the error indication to alert the decompressor to perform alternative error concealment functions.

In the video signal processing path, the transport block data and error signal are coupled to a transport controller 256, and the transport block data is coupled to a first-in- first-out memory (FIFO) 257. The controller 256 reads the transport header data (the first occurring predetermined number of bytes) and stores it in internal memory. The controller monitors the RH pointer in the header data to determine its location in the transport block data stream. After reading the transport header data, the controller 256 conditions the FIFO 257 to accept video data codewords until the occurrence of the first RH (if present) as indicated by the RH pointer. The controller reads the RH and precludes it from being written to the FIFO. Thereafter the FIFO is conditioned to accept the remainder of the video data from the transport block. Video data from the FIFO 257, and transport header data and the error signal from the controller 256 are provided to the priority deselect. The controller may be arranged to a) provide video data from transport blocks in which errors have been detected, or b) to delete entire transport blocks in which errors have been detected and provide only the error indication for such blocks.

Figure 9:
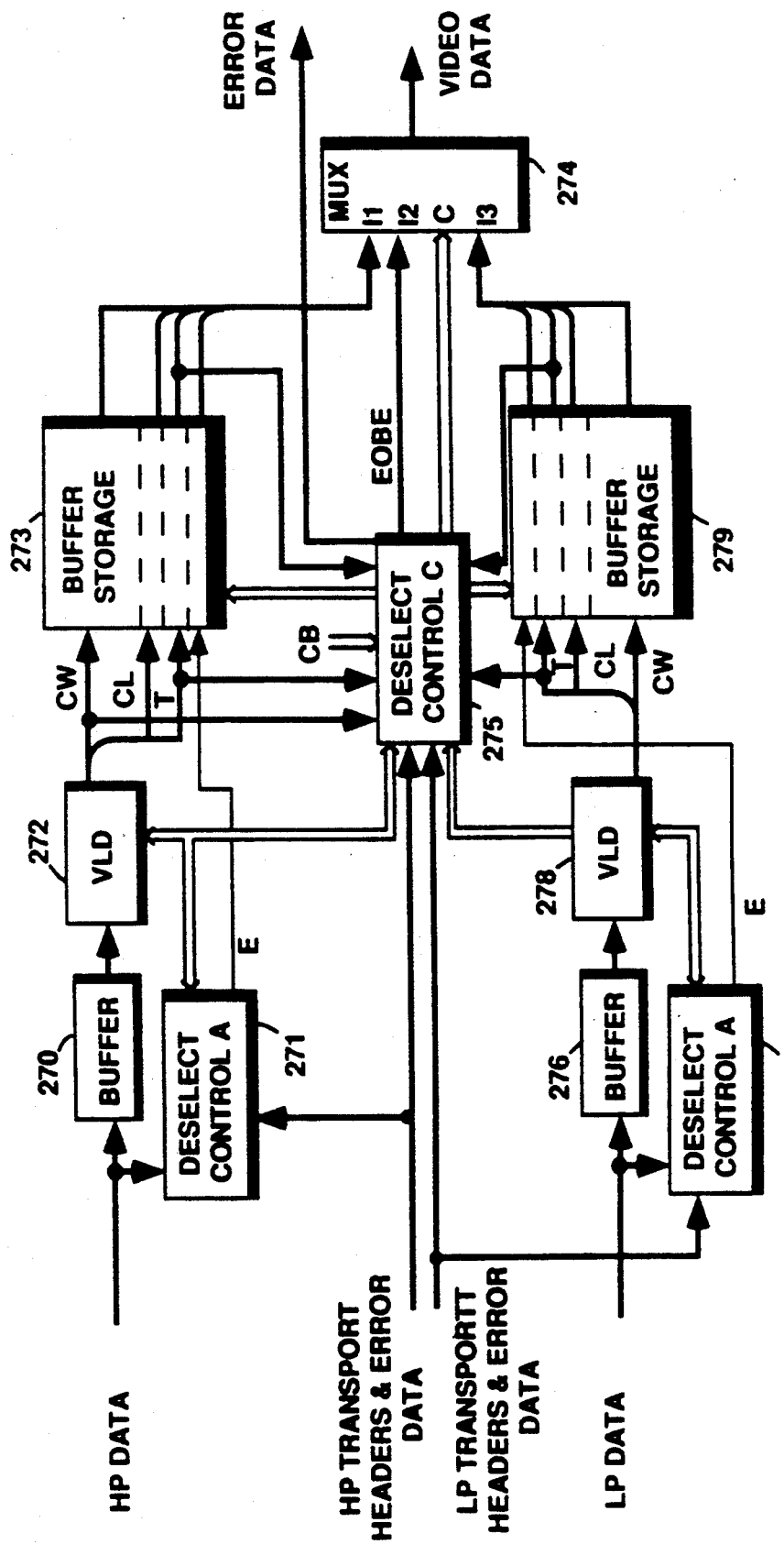
FIG. 9 is a block diagram of exemplary circuitry which may be implemented for the priority deselect circuit 26 of FIG. 1.

FIG. 9 illustrates an exemplary priority deselect processor. The priority deselect processor accepts data from the receiver transport processor and reconfigures it to the form applied to the encoding priority select processor 11. In order to do so respective codewords of the data stream have to be identified, that is the codeword CW#j in each block must be detectable. Since the data is in the form of concatenated variable length codes, it must be at least partially VLC decoded to define the codeword boundaries. Once the codeword boundaries are determined, the codewords may be counted to find CW#j (in the HP channel). After the codeword boundaries are identified the codewords may easily be parsed into respective parallel-bit VLC code form.

In FIG. 9 similar circuits (270, 271, 272, 273) and (276, 277, 278, 279) responsive to HP and LP data respectively, parse the incoming data into parallel-bit VLC codewords. The HP and LP codewords are respectively coupled to a multiplexer 274 which, responsive to a deselect controller 275 recombines the data into a data sequence similar to that provided by the compressor 10.

Consider the HP channel circuitry 270–273. Video data from the element 256 (FIG. 8) is applied to a buffer memory 270 and a deselect controller 271. In addition the HP transport block headers are applied to the controller 271. The video data, absent errors, will occur in predetermined cyclical sequences. Particular points in a sequence are identifiable from the transport block header information. Once a start point is identified, decoding proceeds in the predetermined sequence. The deselect controller 271 is programmed to condition the variable length decoder VLD for operation according to this sequence. For example, assume that the transport header indicates that current data is from an I field and that a record header occured at byte z. The record header was placed at the beginning of a slice, thus the entry point of a slice can be identified relative to byte z. At this point the slice header of known bit/byte coding format is known, which header is followed by a macroblock header of known bit/byte coding format, followed by block data in known coding format, and so on. Thus, responsive to the transport header information the controller 271 establishes the decoding sequence of the VLD 272, i.e., which VLD decoding tables to use for which grouping of VLC codewords. Note that since, e.g., the slice header in the data stream is not variable length encoded, the controller may be arranged to compare common slice header information with transport header information for entry point confirmation.

The video data from the buffer 270 is coupled to the VLD 272 which concatenates a number of the fixed length codewords, and examines the leading bits of the concatenated codewords for a recognizable codeword according to the type of coding expected vis-a-vis the normal cyclical sequence. Once a particular number of leading bits is recognized as a valid codeword, these bits are output as a parallel-bit codeword CW to a buffer store 273. In addition the expected codeword type, T, and codeword length CL are produced and applied to the buffer store 273. As the codewords are loaded into the buffer store 273 they are indexed by the deselect controller 275.

DC and AC coefficient codewords are encoded according to different statistics, and the coefficients of respective blocks within a macroblock are concatenated without including end of block identifiers. In general however the DC coefficient of the first block in a macroblock is identifiable by its position within the bit stream. The VLD cannot discern between the last AC coefficient of one block and the DC coefficient of the next block. Identification is provided by the CW#j included in the transport block header information. The CW#j identifies the last AC coefficient codeword in each block in a slice. To find the codeword numbered (j) the deselect controller 275 monitors the code types T provided by the VLD. The controller 275 counts the AC type codes T, and when j have occurred the controller 275 communicates with the VLD 272 to reset the cycle to a DC coefficient decoding event.

Elements 276–279 in the LP channel operate in a similar manner. The LP data however is expected to include only AC coefficient codewords. The AC codewords for respective blocks within a macroblock are separated by end of block (EOB) codes, hence there is no need to count codewords. The operation of VLD 278 may simply be to decode words which are all coded according to one coding table. The position of the first macroblock in transport block is identified by the respective transport header, and each successive macroblock is identified by record headers. This information is evaluated by the deselect controller 277 for controlling the VLD 278 for indexing the codewords in the storage buffer 279.

Responsive to the indexed information and the type T codewords stored in the storage buffers 273 and 279, the deselect controller 275 concatenates the HP and LP codewords stored in the storage buffers 273 and 274 via a multiplexer 274. The controller identifies a macroblock, conditions the multiplexer 274 to pass data from the HP channel and reads the respective HP data from storage buffer 273 up to codeword CW#j of block one of the macroblock. It then conditions the multiplexer to pass data from the LP channel and reads the AC coefficient codewords corresponding to the same block one, until an EOB type code occurs. Thereafter controller 275 conditions the multiplexer 274 to pass data from the HP channel and commences reading HP data corresponding to block two of the macroblock. After the codeword corresponding to CW#j is read, the controller again switches to read LP data for block two from the LP channel, etc.

If while reading data from the high priority channel an EOB code occurs before the codeword corresponding to CW#j occurs, the controller 275 is reset to read the next block of data from the high priority channel.

The cyclic nature of occurring codewords may be variable. For example some macroblocks within a slice may not be coded and/or some blocks within a macroblock may not be coded. This information is included in the respective slice and macroblock headers. In order to establish and maintain the appropriate decoding cycles, the controller 275, responsive to the codeword types examines the slice and macroblock header codewords to determine the numbers of blocks in respective macroblocks and the number of macroblocks in respective slices. Responsive to these numbers the controller 275 counts particular decoding operations and determines when certain decoding functions have been completed, and restarts a decoding cycle. Note that as indicated previously more than one record header may be included in a transport block, but only the first record header is identified by the transport block header. As such only the first record header in a transport block may be excised by the element 256. In order to identify and extract the information from such record headers, and excise such record headers from the data stream, the controller 275 counts the number of macroblocks processed by the VLD 272, and on completion of the last macroblock in a slice recognizes the next occurring data in a transport block as a record header. It thereafter reads the information in the record header, to establish subsequent cyclic operations, and precludes its passage to the buffer 273.

The controllers 271, 275 and 277 are indicated in the figure as three separate elements, however it should be appreciated that they may be subsumed in a single controller element.

The circuitry of FIG. 9 does not provide variable length decoded data but rather only parses respective variable length codewords, and provides them in a form similar to the data provided at the output of the compressor 10. As such circuitry substantially complementary to compressor 10 may be utilized for the decompressor 27. It should be recognized however that the circuitry of FIG. 9 may be arranged to provide decoded variable length codes obviating a VLD in the decompressor circuitry.

In the FIG. 9 provision is made for a variety of error concealment methodologies. For example, even though a transport block includes an error, the data for that block may be processed and passed on to the decompressor. In this instance an error flag is generated for each data word of the transport block and carried along with the codewords applied to the decompressor. The error flags are provided by the deselect controllers 271 and 277 and coupled to the buffer stores 273 and 279, wherein they are stored in memory locations corresponding with the associated erroneous transport block codewords.

In an alternative system wherein corrupted transport blocks are not processed, assume that a LP transport block is lost. The LP channel provides coefficient data of lesser importance to the reconstruction of images, and in fact DCT blocks may be decompressed without these coefficients, albeit the respective decompressed blocks will exhibit less spatial resolution. Therefore, when LP erroneous transport blocks are excised from the data stream, and data is being reconstructed at the multiplexer 274, after each block codeword CW#j of HP data, an EOB code is inserted in lieu of LP data. The EOB code is provided by the controller 275 and multiplexed into the data stream via the multiplexer 274. To indicate that the EOB for the respective blocks is a forced or artificial EOB, an error flag may be carried along with the EOB signal. The forced EOB signal is designated EOBE.

The controller 275 is provided the transport header information for both channels and indexes the block information available in the storage buffers 273 and 279. The macroblock and block data occur in a known sequence, enabling the controller to recognize lost data, and to provide and append EOBE codes to the HP data for lost LP data.

In general very few errors are expected to occur in the HP channel due to the robustness by which it is transmitted. However, if an error does occur in the HP channel, the data in the LP channel corresponding to blocks of data lost in the HP channel becomes meaningless. The controller 275 is programmed to recognize lost HP data via an interruption of the normal sequence of information identified by the nonerroneous transport block headers. When lost HP data is detected, the corresponding LP data is flushed from the storage buffer 279, that is, it is not passed on to the decompressor. In addition, the controller 275 may be arranged to provide error data to the decompressor, in a form which identifies lost information, i.e., macroblock or slice or frame data which are not being provided from the priority deselect processor.

The controller 275 is responsive to the overall system controller via the control bus CB, to initialize or reinitialize the controllers 271, 277 and VLD's 272, 278 on start up and channel changes, etc. In addition the controller 275 communicates with the transport processor 25 and rate buffers 23 and 24 for controlling the rate of information provided to the priority deselect circuitry.

Figure 10:
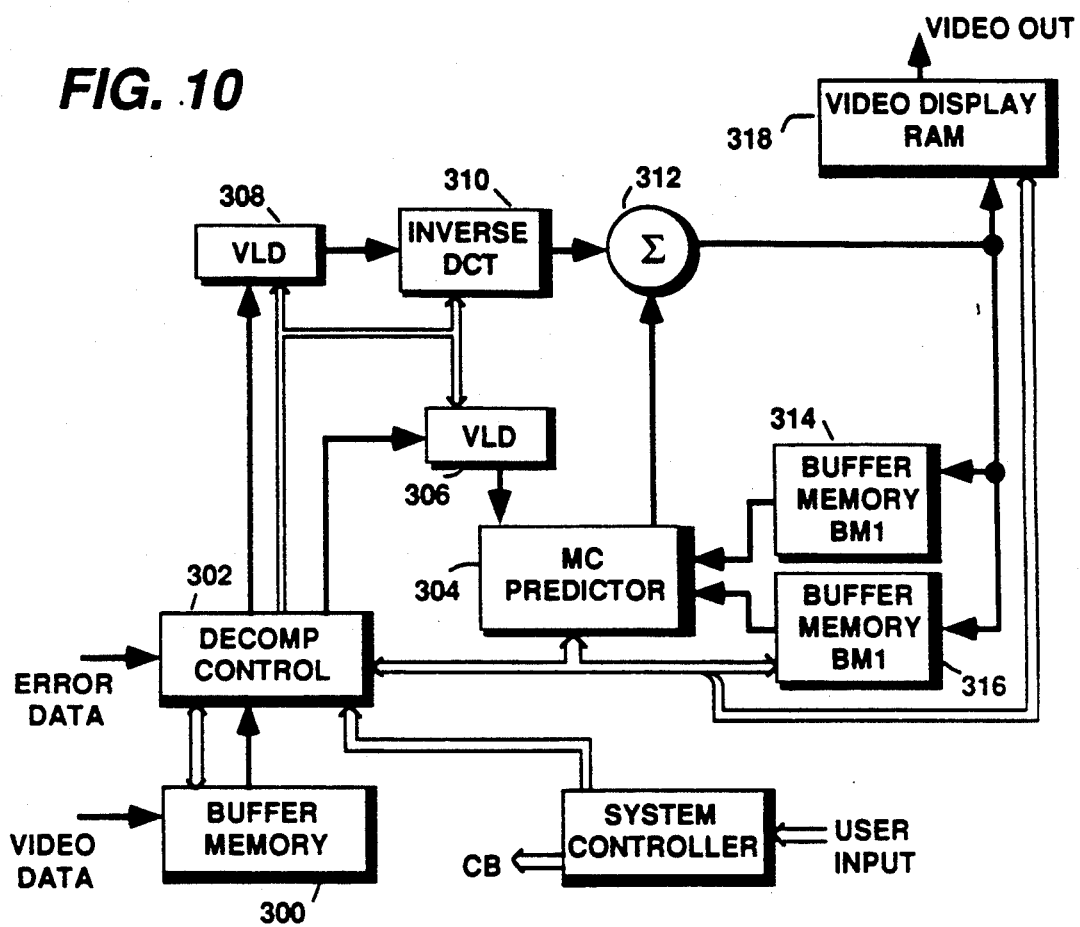
FIG. 10 is a block diagram of exemplary circuitry which may be implemented for the decompression circuit 27 of FIG. 1.

FIG. 10 illustrates an exemplary arrangement of the decompression apparatus 27.

Error concealment will not be discussed with respect to this apparatus as it is not the subject of this invention. Suffice it to say that error data from the priority deselect processor is applied to the decompression controller 302 to preclude updating areas of the video display RAM 318 corresponding to missing blocks of data, and that the apparatus responds to forced EOB codes as if they are normally occurring EOB codes.

Generally the circuitry of FIG. 10 is arranged to decompress video data provided in MPEG-like hierarchical format. The video data provided by the multiplexer 274 of the priority deselect processor is applied to a buffer memory 300. This data is accessed by the decompression controller 302 wherein header data is extracted to program the controller 302. The variable length codewords corresponding to DCT coefficients are extracted and applied to a variable length decoder (VLD) 308 and the variable length codewords corresponding to motion vectors are applied to the variable length decoder (VLD) 306. The VLD 308 contains apparatus for performing variable length decoding, inverse run length decoding and inverse DPCM coding as appropriate under the control of the controller 302. Decoded data from the VLD 308 are applied to an inverse DCT circuit 310 which includes circuitry to inverse quantize the respective DCT coefficients and to convert the coefficients to a matrix of pixel data. The pixel data is then coupled to one input of an adder 312, the output of which is coupled to the video display ram 318 and buffer memories 314 and 316.

The VLD 306 includes circuitry to decode the variable length encoded motion vectors and to perform inverse DPCM coding of the motion vectors as appropriate under the control of the controller 302. Decoded motion vectors are applied to a motion compensated predictor 304. Responsive to the motion vectors the predictor accesses corresponding blocks of pixels stored in one (forward) or both (forward and backward) of the buffer memories 314 and 316. The predictor provides a block of data (from the one of the buffer memories) or an interpolated block of data (derived from respective blocks from both buffer memories) to a second input of the adder 312.

Decompression is performed as follows. If a field/frame of input video data is intraframe encoded there are no motion vectors and the decoded DCT coefficients correspond to blocks of pixel values. Thus for intraframe encoded data the predictor 304 applies a zero value to the adder 312 and the decoded DCT coefficients are passed unaltered by the adder 312, to the video display RAM where they are stored for readout according to normal raster scanning. The decoded pixel values are also stored in one of the buffer memories 314 and 316 for use in forming predicted image values for decoding motion compensated frames (B or P).

If a field/frame of input data corresponds to a forward motion compensated P field/frame, the decoded coefficients correspond to residues or differences between the present field/frame and the lastmost occurring I frame. The predictor 304 responsive to the decoded motion vectors accesses the corresponding block of I frame data stored in either buffer memory 314 or 316 and provides this block of data to the adder wherein respective blocks of residues provided by the inverse DCT circuit 310 are added to the corresponding block of pixel data provided by the predictor 304. The sums generated by the adder 312 correspond to the pixel values for the respective blocks of the P field/frame, which pixel values are applied to the display RAM 318 to update respective storage locations. In addition the pixel values provided by the adder 312 are stored in the one of buffer memories 314 and 316 not storing the I field/frame of pixel data utilized to generate the predicted pixel data.

For bidirectionally encoded (B) field/frames the operation is similar, except predicted values are accessed from the stored I and P pixel data stored in both buffer memories 314 and 316 depending upon whether the respective motion vectors are forward or backward vectors or both. The generated B field/frame pixel values are applied to update the display RAM 318, but are not stored in either of the buffer memories, as B field/frame data is not utilized for generating other field/frames of picture data.

Figure 11:
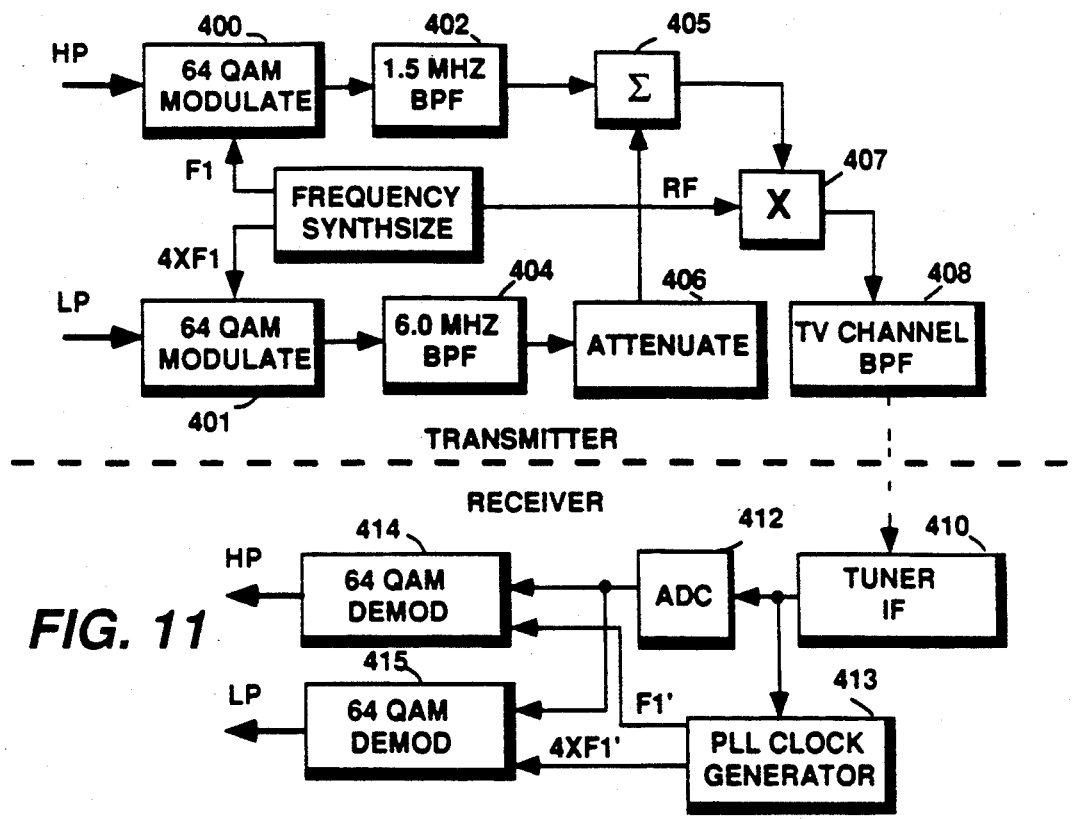
FIG. 11 is a block diagram of exemplary circuitry which may be implemented for the MODEMS 17 and 20 of FIG. 1.

FIG. 11 illustrates exemplary modem circuitry for both the transmitting and receiving ends of the system. HP and LP data from the forward error correction circuits 15 and 16 are applied to respective 64 QAM modulators 400 and 401. The modulator 400 provides an HP analog signal with a −6dB bandwidth of approximately 0.96 MHZ. This signal is applied to a 1.5 MHZ band pass filter 402 to eliminate high frequency harmonics, and then is applied to an analog signal summer 405. The modulator 401 provides an LP analog signal with a −6dB bandwidth of approximately 3.84 MHZ. This signal is applied to a 6 MHZ band pass filter 404 to eliminate high frequency harmonics, and then is applied to an attenuator 406. The attenuator 406 reduces the amplitude of the LP analog signal by approximately 9dB relative to the HP analog signal. The attenuated LP signal is then coupled to the analog signal summer 405, wherein it is summed with the analog HP signal to produce a signal with a frequency spectrum similar to the signal spectrum shown in FIG. 1. The combined signal is applied to a mixer 407 wherein it is multiplied by an RF carrier to frequency translate the combined signal to a frequency band that comports with a standard TV transmission channel. The translated signal is then applied to a band pass filter 408, which tailors the spectral characteristics of the frequency translated signal to fit within the standard channel.

At the receiver, the transmitted signal is detected by a tuner/IF circuit 410 of conventional design, and applied to a PLL circuit 413 and an analog-to-digital converter (ADC) 412. The digitized signal is coupled to respective 64 QAM demodulators 414 and 415. The demodulators 414 and 415 include band pass filters at their respective input connections to band limit the spectrum of the signals to be processed thereby to conform to the nominal signal spectrum of the HP and LP signals. The demodulators 414 and 415 are of conventional QAM demodulator design and are responsive to clock signals provided by the PLL circuit 413. The PLL 413 develops the requisite clock signals via phase locking a signal developed by a voltage controlled oscillator to one of the two carriers attendant the QAM signals.

The invention has been described in terms of an MPEG like signal however it should be appreciated that it is amenable to processing signals compressed in other formats and by other transforms. The only requirement on the type of compression is that it provide data that can be prioritized in hierarchical levels, as for example sub band or pyramid transforms.

What is claimed is:

1. In a video signal encoding system, wherein encoded video signal occurs, at least in part, as a succession of groups of data (e.g. slices), apparatus for segmenting encoded video signal data into transport blocks, comprising:
   a source of encoded video signal data;
   first means, responsive to said encoded video signal data, for deriving from said encoded video signal data, indicia identifying respective groups of said encoded video data and generating therefrom transport headers TH and RH, said transport header TH including a pointer to a relative position within a transport block at which said transport header RH is to be located;
   second means, cooperating with said first means and responsive to said encoded video signal data, for multiplexing said transport header data and said encoded video signal data to form partial transport blocks of a predetermined amount of data; and error encoding means, responsive to respective partial transport blocks, for generating error check codes for respective partial transport blocks, and appending said error check codes to corresponding partial transport blocks to form said transport blocks.

2. The apparatus set forth in claim 1 wherein respective transport blocks may include portions of consecutive groups of data, and said first and second means include means for embedding said transport header RH between said consecutive groups of data.

3. The apparatus set forth in claim 1 wherein said encoded video signal data is in the form of variable length codewords, and said apparatus further includes means responsive to said encoded video signal data, for arranging said variable length codewords into fixed length codewords.

4. In a video signal system for processing encoded video signal data conveyed in transport blocks, said transport blocks including a first transport header TH in a predetermined transport block location, a second transport header RH placed at variable locations within said transport blocks, which variable location is identified by a pointer in said first transport header, and an error check code located in a predetermined location in said transport block, apparatus comprising:

means for receiving and providing conveyed transport blocks;

error check means, responsive to said received transport blocks, for performing an error check on respective transport blocks in cooperation with associated error check codes, and providing an error indicating signal upon the detection of bit errors in said transport blocks;

control means, coupled to said error check means, for excising said error check codes from respective transport blocks, extracting said transport header TH from respective transport blocks and determining therefrom the location within said transport blocks of said transport headers RH, and extracting said transport header RH from respective transport blocks, and including means for providing encoded video signal included within said transport blocks exclusive of said extracted transport block headers and said error check codes.

5. The system set forth in claim 4 wherein said control means further includes means responsive to said error indicating signal for excising video signal transport blocks in which errors are detected.

6. The system set forth in claim 4 wherein at least a portion of the first transport header is Hamming code protected and the control means includes Hamming code error correction circuitry.

7. The system set forth in claim 4 wherein the signal processed by the system includes transport blocks of different signal types (e.g. video, audio etc.) and said control means includes means responsive to said first transport header for parsing the transport blocks of different signal types into respective signal paths.

8. The system set forth in claim 4 wherein the encoded video signal includes a sequence of transport blocks which have undergone forward error correction processing and forward error correction codes are appended thereto, and said means for receiving includes forward error processing circuitry, responsive to said forward error correction codes, for correcting at least a portion of errors incurred in conveying the encoded video signal data.

9. Apparatus for arranging compressed video data for transmission, comprising:

a source of compressed video data;

means responsive to said compressed video data for segmenting said video data into substantially equal blocks;

means responsive to said compressed video data for generating block header information related to the video data for respective blocks;

means for providing first error protection (e.g. HAMMING coding) to at least a portion of said header information;

means for concatenating said blocks of video data with respective header information;

means for providing second error protection (e.g. CRC coding)over concatenated blocks of video data and header information and appending error check bits thereto;

means for providing third error protection (e.g. forward error correction such as REED-SOLOMAN coding) over said concatenated video data and header information with error check bits appended, and appending further error check bits thereto; and means for transmitting data provided with said third error protection.

10. The apparatus set forth in claim 9 wherein said video data is provided as variable length codewords and said apparatus further includes means for arranging said variable length codewords into codewords of predetermined numbers of bits.

11. The apparatus set forth in claim 9 wherein said means responsive to said compressed video data for generating block header information related to the video data for respective blocks, generates first header data TH to be located at a predetermined location in each block, and second header data RH to be imbedded between portions of video data within a block, and wherein said means for generating block header information includes means for generating indicia included in said first header for locating said second header.

12. In a video signal encoding system, wherein encoded video signal occurs, at least in part, as a succession of groups of data (e.g., slices), wherein each group includes a plurality of subgroups (e.g., blocks) of interdependent coded data representing a contiguous area of an image, apparatus for arranging encoded video signal data in transport blocks, comprising:

a source of encoded video signal data;

first means, responsive to said encoded video signal data, for dividing the encoded video data into segments of substantially equal amounts of data, respective segments representing encoded video data to be included in respective transport blocks, respective segments including video data from one or more of said groups, and wherein subgroups of data from ones of said groups may be in more than one segment;

second means, for generating transport headers including information to identify first occurring groups of data in respective segments, and for generating further headers including information identifying second occurring groups of data in respective segments which include data from first and second groups of data, said further headers to be located between first and second groups of data in respective transport blocks, said second means also generating, and including in respective transport headers, information indicating the location of said further headers in respective transport blocks;

third means, cooperating with said first and second means, for multiplexing respective transport headers with corresponding segments and further headers to form partial transport blocks, with respective transport headers located in a predetermined location in respective transport blocks; and error encoding means, responsive to header information and encoded video data in respective partial transport blocks, for generating error check codes over respective partial transport blocks, and appending said error check codes to corresponding partial transport blocks to form said transport blocks.

13. The apparatus set forth in claim 12 wherein said second means generates and includes in said transport headers, information for detecting errors in at least a portion of said transport headers.

14. The apparatus set forth in claim 13 further including forward error check means (e.g., a REED-SOLOMAN coder) for generating error detection/correction codes over said transport blocks, and appending said error detection/correction codes to the blocks of data over which the error detection/correction codes were generated.

15. A system for receiving conveyed encoded video data occurring as a sequence of transport blocks, respective transport blocks including one or more of successively occurring groups of video data, wherein each group includes a plurality of subgroups (e.g., blocks) of interdependent coded data and each group represents a contiguous area of an image, and wherein subgroups of ones of said groups of video data may be included in successive transport blocks; respective transport blocks including transport headers for identifying video data from a first occurring group of data in respective transport blocks, and information indicating the location of further headers in a respective transport block, said further headers identifying second occurring groups of data in respective transport blocks, said transport blocks also including respective error check codes for detecting data errors incurred during signal conveyance, said system comprising:

means for detecting said conveyed encoded video data and providing respective transport blocks;

error detection means, responsive to said error check codes for detecting the presence or absence of errors in respective transport blocks, excising transport blocks which include errors, and passing transport blocks which are free of errors;

means, responsive to error free transport blocks, for separating transport headers, and further headers from encoded video data; and means, responsive to separated transport headers, for excising video data from error free transport blocks which video data corresponds to data included in a group of data occurring in part in said error free transport block and in part in a preceding transport block which included a detected error.

16. The system set forth in claim 15 wherein the encoded video data is conveyed in high and low priority channels of transport blocks of interdependent video data, with respective groups of data being conveyed in part in the low priority channel and in part in the high priority channel, and said means, responsive to separated transport headers, for excising video data from error free transport blocks, includes means for excising groups of error free video data in the low priority channel corresponding to groups of data in the high priority channel which have been excised.

17. A system for receiving conveyed encoded video data occurring as a sequence of transport blocks, respective transport blocks including one or more of successively occurring groups of video data each of which represents a contiguous area of an image, wherein each group includes a plurality of subgroups (e.g., blocks) of interdependent coded data, and wherein subgroups of ones of said groups of video data may be included in successive transport blocks; respective transport blocks including transport headers for identifying video data from a first occurring group of data in respective transport blocks, and information indicating the location of further headers in a respective transport block, said further headers identifying second occurring groups of data in respective transport blocks, said transport blocks also including respective error check codes for detecting data errors incurred during signal conveyance, said system comprising:

means for detecting said conveyed encoded video data and providing respective transport blocks;

error detection means, responsive to said error check codes for detecting the presence or absence of errors in respective transport blocks, excising transport blocks which include errors, and passing transport blocks which are free of errors;

means, responsive to error free transport blocks, for separating transport headers, said further headers and encoded video data from the detected transport blocks; and means, responsive to separated transport headers, said further headers and encoded video data for decoding said encoded video data.

* * * * *